May 18, 1937. J. N. BAKER Re. 20,365
PORTABLE POWER HAMMER
Original Filed July 3, 1931 4 Sheets-Sheet 1
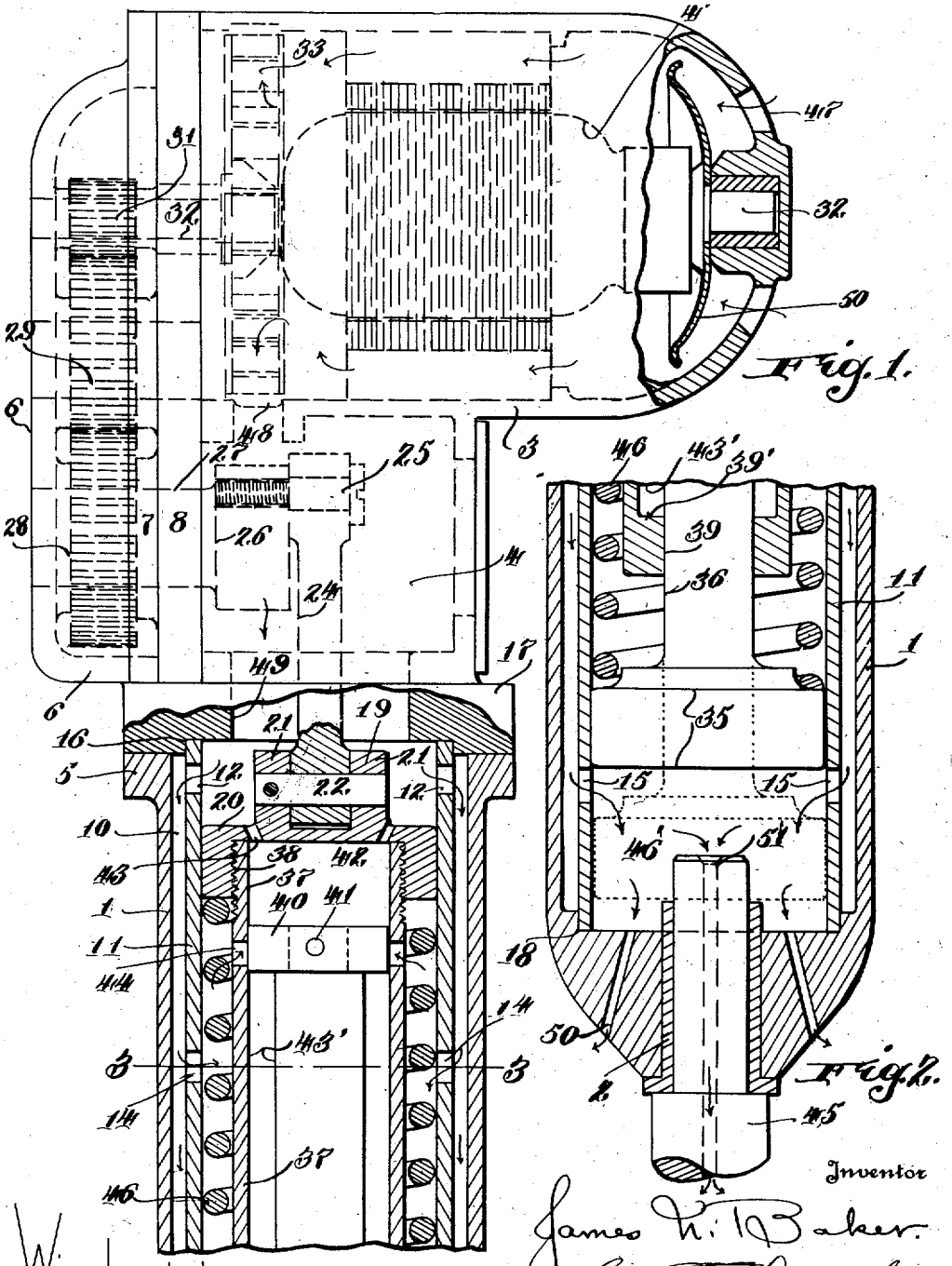
Inventor
James N. Baker.
By Edwin H. Samuels
Attorney
Witness
Robert W. Flaull May 18, 1937. J. N. BAKER Re. 20,365

PORTABLE POWER HAMMER

Original Filed July 3, 1931 4 Sheets-Sheet 2

Witnesses
Pond W. J. Hault

Inventor
James N. Baker
By Edwin J. Hannah
Attorney

May 18, 1937. J. N. BAKER Re. 20,365

PORTABLE POWER HAMMER

Original Filed July 3, 1931 4 Sheets-Sheet 3

Witness

Inventor

James N. Baker

By Edwin Hammele

Attorney

May 18, 1937. J. N. BAKER Re. 20,365

PORTABLE POWER HAMMER

Original Filed July 3, 1931 4 Sheets-Sheet 4

Witness
Ralph H. Lauth

Inventor
James N. Baker
By Edwin Pancoast
Attorney

Reissued May 18, 1937 Re. 20,365

UNITED STATES PATENT OFFICE 20,365

PORTABLE POWER HAMMER

James N. Baker, Towson, Md., assignor to The Black & Decker Manufacturing Company, Towson, Md., a corporation of Maryland Original No. 2,013,296, dated September 3, 1935, Serial No. 548,596, July 3, 1931. Application for reissue January 6, 1937, Serial No. 119,279

18 Claims. (Cl. 125—33)

The present superiority in point of operation of the standard pneumatic or air hammer is due mainly to the fact that air under pressure is admitted to the cylinder at exactly the right time to catch the piston as it passes the dead point and force it downward with increasing velocity until the blow is struck upon the bit or tool which may be a rivet set, a metal chipping chisel or a rock drill. The increase in velocity is obtained by introduction of pressure air back of the piston throughout the major portion of the stroke and by the expansion of this air.

In the most familiar type of spring operated hammer the ram is elevated compressing the spring by means of a cam, the ram being suddenly released from the upper limit of its travel, from which point the expansion of the spring thus released moves it to the opposite end of its stroke. It will be understood that in a tool of this kind the energy stored in the compressed spring is spent in overcoming the inertia of the ram, imparting thereto a certain velocity. The pressure of the spring, however, is of constantly decreasing intensity and by the time the ram contacts the bit the full force of the spring is spent and its pressure has relaxed, and the transfer of energy to the ram has ceased or been reduced to the minimum.

The energy transferred to the tool or bit by a ram of a given weight is directly proportional to the velocity of the ram at the instant the blow is struck. This velocity is, in turn, determined by the thrust applied to the ram and the length of time during which this thrust is applied to the ram during the working or downward stroke.

Conditions, i. e., mechanical considerations and inherent spring characteristics, limit the stroke in a hammer of this type to the minimum length and thus limit the speed of the ram to minimum velocity.

The invention relates to a mechanical hammer so designed that the ram is given a double impulse, i. e., an initial velocity, by mechanical means and an additional impulse applied at the proper instant due to the release of energy stored in a spring. In this way a hammer is produced which has an increased length of effective stroke. The energy acting upon the ram is increased during the first half of the working stroke whereupon the energy is suddenly released from a spring previously compressed and this energy is added to the kinetic energy already stored in the ram due to the speed previously generated, thus increasing its velocity at the instant the blow is struck. The mechanical operation thus suggested gives a result similar to that obtained with the air operated tool.

The recoil of the ram after it strikes the tool when the latter is in contact with the work has an important effect in the operation of the tool, in fact the operation of the hammer depends almost entirely upon the rebound velocity of the ram to carry it back to a position in which it receives the energy for striking another blow, and the coil spring which is interposed between the driving mechanism and the ram serves to absorb this excess energy thereby eliminating any shock to the operator as the result of this rebound.

This coil spring performs a very important function by thus storing and later delivering the excess energy back to the ram during the second half of its forward stroke thus insuring an action which is very similar to that of an air hammer. As a result of this operation of the spring, the ram has an increasing velocity up to the time the blow is struck. This is an important advantage, it having been found that in the majority of the mechanically operated hammers as distinguished from air hammers the speed of the ram decreases toward the end of the forward stroke. The words "coil spring" are symbolical of any suitable resilient means.

It is also found that with the change of material operated upon and consequent change of the coefficient of impact there is a tendency to change the speed of the motor due to the variation of load and a consequent tendency of the mechanism to get out of step. This difficulty is found to be overcome by the automatic compensating effect of a cylinder and piston connection between the cross head and ram which are modified as to their relation and operation by an air vent in the cylinder. Thus when the coefficient of impact is low and the ram tends to be sluggish in returning to the top of its stroke, the vacuum in the cylinder largely overcomes and equalizes this tendency. On the other hand when the coefficient of impact is high and the ram tends to return too quickly after the impact, the pressure in the cylinder retards this movement. Thus, should the load, due to change of material and change of coefficient of impact, momentarily decrease so that the motor would tend to pick up, this alternate pressure and lack of pressure within the cylinder as modified by the vent will tend to keep the ram and driving mechanism in step in much the same way that a fly wheel controls a reciprocating engine.

This automatic compensating device also performs an important function in starting, in that the alternate vacuum and pressure connection between the cross head and the ram provide for a gradual assumption of the load by the motor. On the first upward stroke the cross head cylinder tends to pull the ram with it and on the following downward stroke it advances the ram which strikes the tool holder and then rebounds, the speed and the pressure in the cylinder being gradually built up until the maximum operation is reached.

In the accompanying drawings I have illustrated preferred and several modified forms of portable electrically operated hammer embodying the mechanical features of the invention. While an electric motor is used as a source of energy in accordance with the preferred embodiment of the invention any suitable source of rotary energy may be substituted therefor.

Figure 1 is a fragmentary elevation partly in section showing the upper portion of a mechanical hammer embodying the invention, the section being taken on the plane of the axis.

Figure 2 is a section on the same plane of the lower portion of the hammer, the same being continuous with the lower portion of Figure 1.

Figure 3:
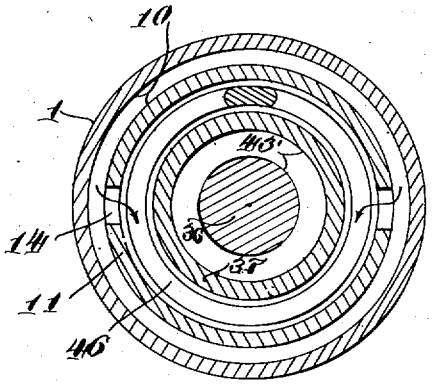
Figure 3 is a transverse section on the line 3, 3 in Figure 1.

Referring to the drawings by numerals, each of which is used to indicate the same or similar parts in the different figures, and having particular reference at this time to Figures 1, 2, and 3, the construction shown comprises an outside casing for the hammer mechanism otherwise known as the hammer barrel 1, in one end of which is located a bushing or guide 2 for the tool or bit, the opposite end of the barrel being attached to the motor casing or frame 3 which encloses an electric motor 4' by which the tool is driven. The casing 3 as illustrated is provided with an extension 4 referred to herein as the crank case to which the barrel 1 is directly connected by means of a flange 5. There is also a gear casing 6 closing the end of the motor casing and the crank case 4 and secured thereto by flanges 7, 8.

Within the hammer barrel 1 and separated therefrom by the peripheral air space 10, is an inner guide sleeve 11, which is preferably concentric with the barrel and in axial alignment with the tool bushing 2. This guide sleeve 11 is provided with air ports 12 at the top 14 near the center and as shown somewhat above the center and 15 near the bottom, and the guide sleeve as shown is supported at the top in a circumferential seat or rabbet 16 in the crank case flange 17 and at the bottom in a similar seat or rabbet 18 in the lower closed end of the barrel or hammer casing 1.

Slidably mounted in the sleeve 11 is a crosshead or follower 20 having a piston portion 19 fitting in the sleeve or guide 11 and spaced lugs 21 projecting upwardly therefrom in which is mounted wristpin 22, which is engaged by the connecting rod 24, which also engages crank pin 25 on the crank disk 26, operated and supported by a short stud or crank shaft 27. This shaft is, in turn, carried and driven by toothed gear 28 in the gear casing 6. This gear 28 is driven by reducing gear 29, from a pinion 31 on the shaft 32 of the motor 4 which also carries a centrifugal fan 33 to be further considered. While the term crosshead is thus applied to a member which resembles in function the crosshead of a steam engine, the term is used in the broad sense including any type of sliding guide member or follower which can be used for the same or a similar purpose to that of crosshead 20.

The ram 35 is slidably mounted in the guide sleeve 11 in which it fits after the manner of a piston in its cylinder. This ram has an upwardly disposed reduced neck or shaft portion 36. The cross head 20 carries a depending tubular member or cylinder 37 which is shown as threaded into the cross head at 38 at its upper end extending downwardly within and preferably concentric with the guide sleeve 11 and barrel 1, and having in its lower end an opening 39. This opening serves as a slide bearing for the neck or shaft 36 of the ram 35 which extends upwardly into the upper end of this elongated cylinder or cage 37. The upper end of the shank 36 is guided by a snug fitting yet slidable piston 40, which is suitably attached to the upper end of the shaft 36 in any convenient manner as by means of a pin 41 or a thread not shown. The cylinder 37 is thus divided by the piston 40 into two chambers 42 and 43', the volume of which is contracted and expanded as the ram and crosshead and hence the cylinder 37, moves up and down relatively to the barrel. These members also move one relatively to the other. The chamber 42 provides a vacuum and pressure connection between the crosshead and ram, the extent of the vacuum and pressure being regulated by the number and size of relief ports 43 extending from the chamber 42 through the crosshead piston 19. The chamber 43' below the piston 40 and within the barrel 37 will be referred to as the compression chamber. The cylinder 37 is provided with ports 44 in its sides covered by the piston 40 in its lowermost position under normal operative conditions, i. e., with a tool or bit 45 operatively located in the tool bushing 2 as shown in Figure 2.

Surrounding the cylinder 37 and bearing at its upper end on the crosshead 20 and at its lower end on the ram 35 is a compression spring 46, the words spring or coil spring being used to denote any resilient element.

When a device of this type if operated in a dust laden area the suction produced by the rapidly moving ram 35 has a tendency to draw dust into the working chamber 46' immediately below the ram and within the guide sleeve 11. This results in excessive wear and is detrimental to the operation of the tool. In the operation of this type of hammer it is avoided as hereinafter described.

It is intended to use all or part of the cooling air from the fan 33 which cools the motor to ventilate the machine and prevent the accumulation of dust in the locations where it would do the most harm. This air is drawn into the motor casing by way of the openings, 47, at the right and after being drawn through the motor as indicated by the arrows, it is ejected downwardly by the fan 33 through the opening 48 into the crank case 4 whence it passes through the opening 49 around the connecting rod 24 and outwardly through the ports 12 into the annular air space 10. When the ram 35 moves to its uppermost position, this air passes through the ports 15 into the chamber 46'.

Figure 8:
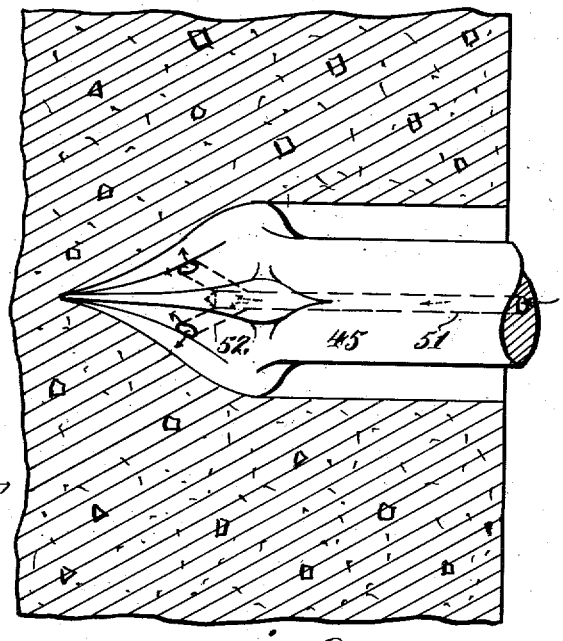
Figure 8 is a section through a block of stone or concrete showing a rock drill in operation in accordance with the invention, the same being broken away for convenience of illustration.

The ram 35 upon its down stroke first closes the ports 15 and then forces the air in chamber 46' outwardly and downwardly through ports 50 provided in the lower end of the hammer barrel or casing for this purpose or the air may be passed through a hollow drill steel, the hollow in the steel 45 being indicated at 51. This manner of discharging the air serves to keep the cutting edge of the tool free from dust and chips as best illustrated in Figure 8, the air being released adjacent the point of the tool by branch passages 52.

A small part of the air admitted through opening 49 is drawn through the ports 43 into the vacuum space 42 at the upper end of the cylinder 37 and from the annular space 10 the air passes through the ports 14 and 15 to the inside of the sleeve 11.

All of the air admitted to the hammer barrel must of necessity be clean and free from abrasive dust. The invention therefore provides a circular air cleaning plate 50 of the centrifugal type. This is mounted on the shaft 32 of the motor, and in its operation it separates the dust from the air, throwing it out of the air draft and projecting it by centrifugal force against the wall of the motor casing 3. In this way the dust is removed from the air draft and accumulates within the casing, from whence it may be removed from time to time through any suitable openings. Openings 47 may be utilized in this way, but preferably other openings are provided for this purpose. The details of this type of air cleaner, which is well known to the art, are not important, and any suitable and convenient device for cleaning the air may be substituted.

The impact of the ram against the tool generates heat. This heat radiates to the outer casing or hammer barrel 1 and would tend to increase the temperature of this part to such a degree that discomfort to the operator would result. The passage of the air down through the annular space 10 between the barrel 1 and the guide stay 11 and out through the ports 50 or the tool passage 51 serves to carry away the main portion of the heat produced by the impact as well as the heat resulting from the movement and the friction of the reciprocating parts within the hammer barrel. The air in the annular chamber 10 also acts as an insulator to prevent the heat from being conducted to the outer shell, all of which provisions tend to increase the comfort to the operator.

In the operation of the tool as the speed of the motor is increased, the speed of the cross head 20 and the cylinder 37 carried thereby, is likewise increased. The ram 35 is resiliently and controllably connected to the crosshead 20 and the cylinder 37 by means of alternating vacuum and pressure in the space 42 over the piston 40 in the cylinder 37, the changes of pressure being influenced by restricted movement of the air through the passages 43, which may be proportioned or arranged as preferred. It should also be understood in this connection that the recoil of the ram as the speed of the piston increases due to the impact of the ram on the tool tends to reciprocate the piston 40 in and relatively to the cylinder 37 and relatively to the crosshead which action is influenced by the pressure or the partial vacuum as aforesaid in the spaces 42, 43'. The speed and hence the momentum of the ram tend to increase as the speed of the cylinder increases, but this action is modified by the resilient, as distinguished from a positive, connection of the ram to the crosshead or follower 20 by means of the pressure and vacuum chambers 42 and 43' and piston 40. The said action is also modified by the pressure of spring 46 which stores energy on the rebound of the ram and applies it to the ram in the latter half of the forward or downward stroke.

As an illustration of the action of the ram 35, and cylinder 37 it may be noted that the motion of the ram is reversed as it strikes the tool 45 at the end of the downward stroke, the recoil being utilized as above described. If the tool is removed, the ram 35 is permitted to descend to a still lower position, indicated by dotted lines in Figure 2, in which event the piston 40 uncovers the ports 44, thus destroying the vacuum in the chamber 42 and introducing therein an air pressure corresponding to that in the chamber 43. At the same time the pressure chamber 43' is transformed to a vacuum chamber. Under these circumstances the ram 35 may be considered as disconnected from the oscillating cylinder 37 due to the uncovering by the piston 40 of the ports 44 and the passage of the ram 35 by ports 15. This feature is of considerable advantage in that it obviates hammering of the ram in idling without a tool or bit. A somewhat similar effect is obtained in this device and that of Figure 6 by means of vent 43 without port 44.

Figure 6:
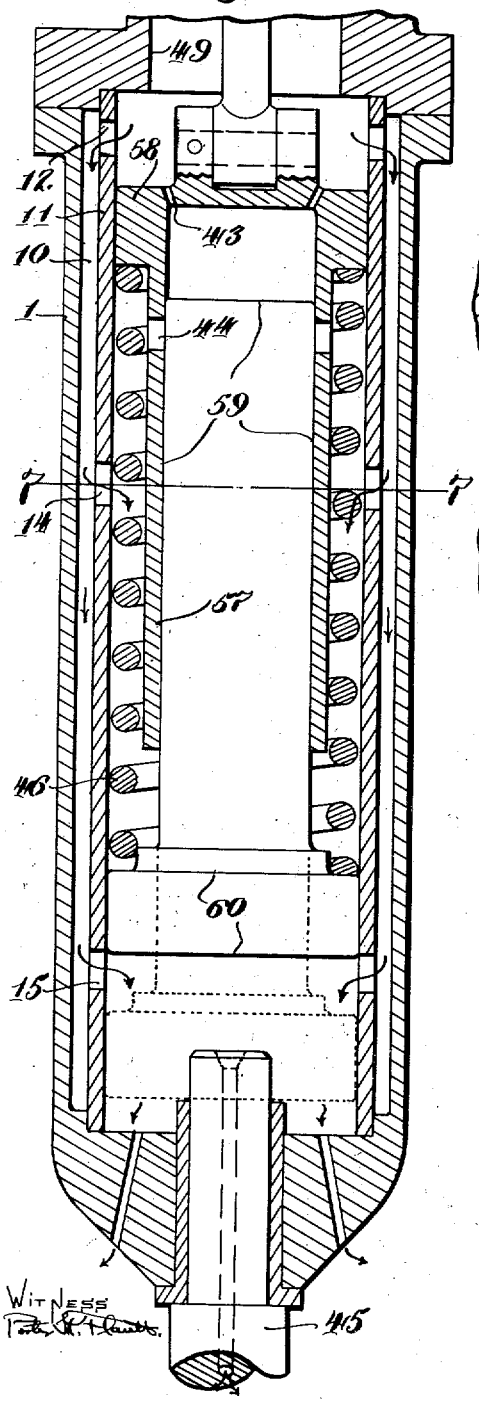
Figure 6 is a longitudinal section on the line of the axis showing the barrel of a further modified form of the hammer of the invention.
Figure 7:
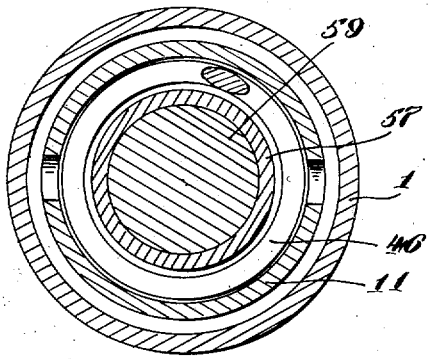
Figure 7 is a transverse section on the line 7, 7 in Figure 6.

Figures 6 and 7 show a construction in which there is a cylinder 57 which may be made integral with the cross head 58.

The rod or neck of the ram 60 indicated by reference character 59 is so proportioned as to form a close fitting piston within the cylinder 57. There is a vent 43 and there may be a port 44 but otherwise corresponding parts are indicated by the same reference characters. As in Figures 1 and 2, the important departure in principle of operation in the construction of Figures 6 and 7 from that shown in Figures 1, 2, and 3, is that the compression chamber 43', beneath the piston 40, and the function thereof are omitted.

Figure 4:
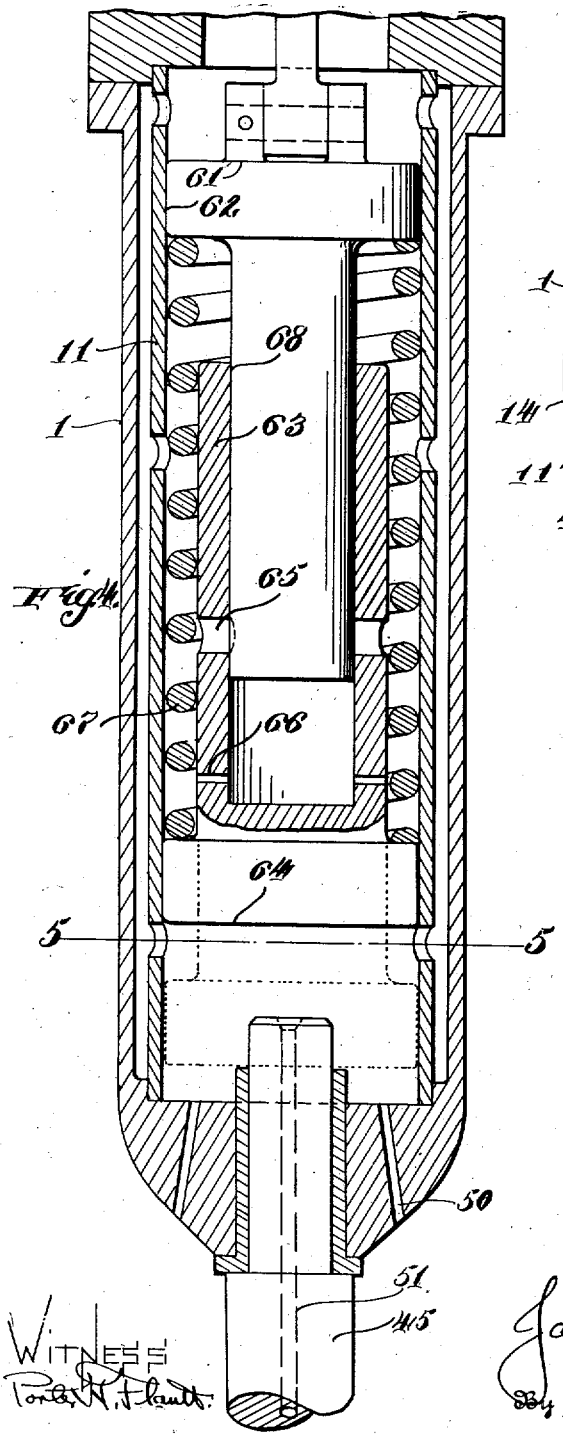
Figure 4 is a longitudinal section on the axis of the barrel of a modified form of the hammer of the invention.
Figure 5:
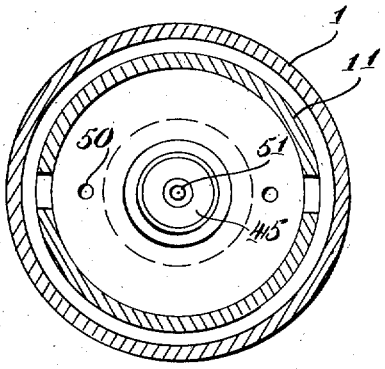
Figure 5 is a transverse section on the line 5, 5 in Figure 4.

The construction, Figures 4 and 5, is substantially identical in principle of operation with that of Figures 6 and 7, but the actual physical contour of the parts is different in that, for the cylinder 57 in Figure 6 a piston or plunger rod 68 has been substituted, the same being formed integrally with a cross-head 61 which comprises as a part of its integral structure a crosshead 62 corresponding closely to the construction of the crosshead 58, Figure 6. From the center of the piston 62 the elongated plunger or piston 68 extends downwardly entering and cooperating with a cylinder 63 formed on and integral with the ram 64 from the center of which cylinder 63 projects upwardly within and for a large part of the length of the guide sleeve 11. This cylinder 63 corresponds to the piston 59 of the ram 60, Figure 6, the construction of Figure 6 as to these parts being thus inverted. Otherwise the structure, Figure 4 is like Figures 6 and 7. This cylinder 63 has ports 65 corresponding to the ports 44, Figure 6 and Figure 1 and vents 66 corresponding to and serving the purpose of the vents 43, Figure 6. The lower end of the ram 64 is in the form of a piston fitting and sliding in the sleeve 11 as the ram 35 fits and slides in the guide sleeve 11 in Figure 2, and the spring 67 bearing at one end against the crosshead piston 62 and at the other end against the ram 64 corresponds in every way to the spring 46, Figures 1 and 6, the word "spring" being used to designate any suitable resilient element.

Having particular reference to Figure 6, the construction of which is similar in its operation to that of the construction in Figure 4, the tool 45 being in working position, the ram 60 is held in varying relation to the cylinder 57 and crosshead 58 by means of the spring 46, and the alternating partial vacuum and pressure in the said cylinder. The ram will therefore move in correspondence with the crosshead 58, varying therefrom in the first half of the up stroke, due to the rebound of the ram from the tool or tool holder, the ram moving faster than the crosshead 58. This rebound energy is stored by compression of spring 46 and by compression of air in the cylinder 57 above piston 59 so that the speed of the ram in the latter half of the up stroke approaches that of the cross head 58. On the first half of the down stroke, there is further compression of the spring 46 and the air above the piston 59 in cylinder 57 so that the ram moves slower than the cross head. In the last half of the forward or down stroke the spring 46 and the air in cylinder 57 expand so that the speed of the ram increases relatively to the cross head and positively, giving continuously increased speed throughout the down stroke until the time of impact.

Important advantages of this improved hammer having the cylinder and piston connection between the crosshead and ram with the spring advance and pressure control upon which advantage the successful operation of this hammer is to a large degree dependent are first, the utilization of the energy not consumed in cutting, i. e., the energy of the recoil of the ram from the tool to return the ram to a position to receive energy for striking another blow, thus compressing the spring and the air back of the ram piston both of which are further compressed in the first half of the down stroke of the cross head, the excess energy thus stored in the spring and compressed air being applied in the last half of the down stroke increasing the speed of the ram to maximum at the end of the stroke, as in an air hammer.

It is also of interest that the advance of the ram relatively to the crosshead at the end of the down stroke draws in air through the vent which increases the compressible volume of air available on the rebound to store energy for the next working stroke or compensating for what is lost during compression.

A second important advantage contributing to the result is the ability of the mechanism to compensate for change of load due to change of material operated on and consequent change of the coefficient of impact. This compensation which prevents the mechanism from getting out of step, due to change of motor speed with such changes of load, is effected by the release of air or its admission to the chamber 42 back of the ram piston, helping the up stroke of the ram when the rebound is reduced and retarding it when the rebound is suddenly increased. This operation is comparable to the equalizing effect of a fly wheel. This compensating feature is also helpful in starting, giving a gradual application of the load to the motor as the strokes of the ram are built up to operating speed. On the first stroke of the crosshead the vacuum in the cylinder 57 tends to pull the ram upwardly with the crosshead. On the following stroke, there is a slight rebound of the ram from the tool and this increases until maximum operation is reached as previously described under, utilization of recoil.

Figure 9:
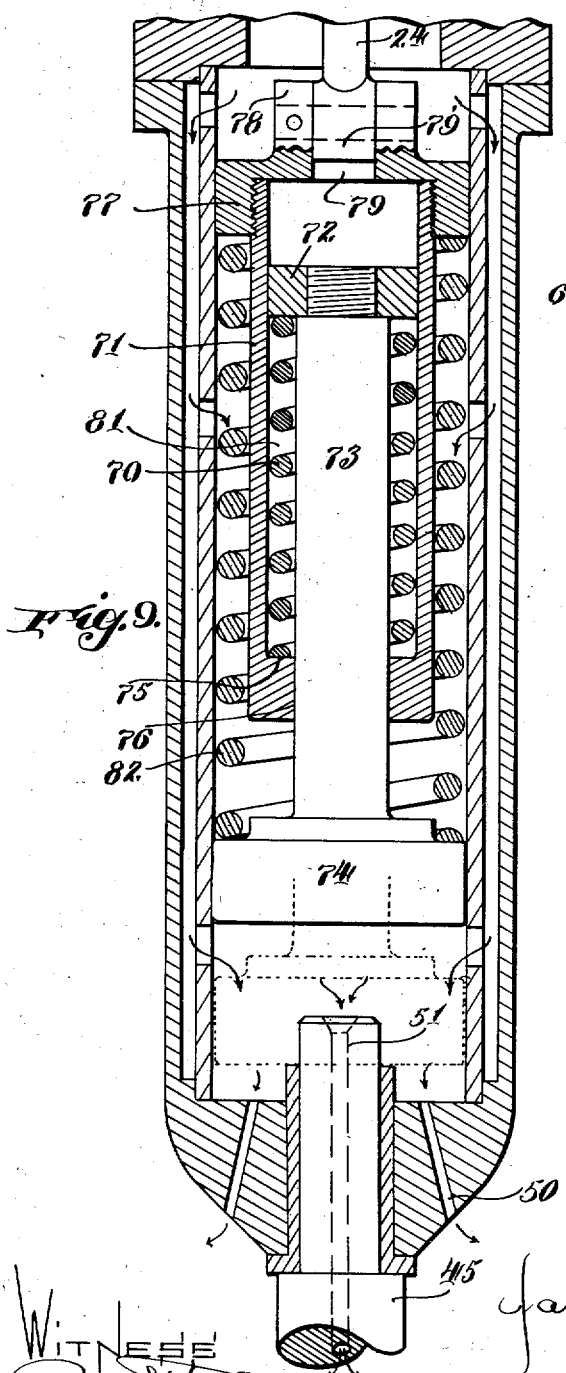
Figure 9 is a section similar to Figures 4 and 6 showing still another modified form of the hammer in which a spring is substituted for the vacuum connection to be described.
Figure 10:
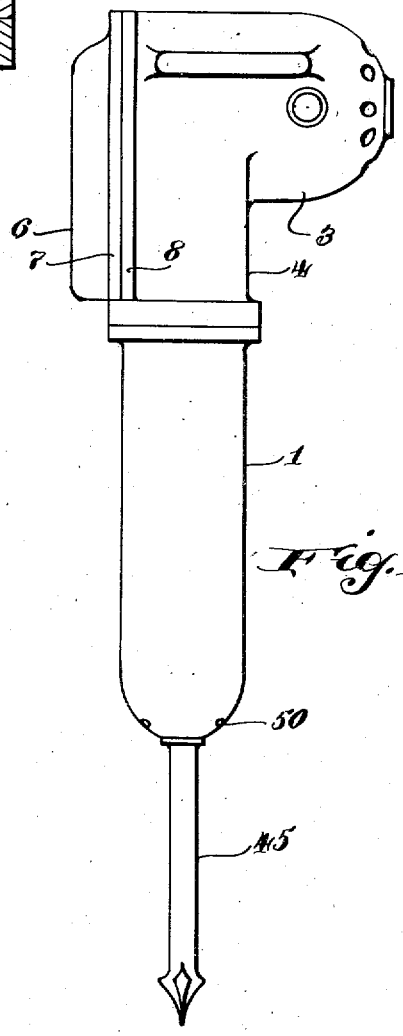
Figure 10 is an elevation of the tool on a reduced scale.

In Figure 9, I have shown a construction which is identical with the construction, Figures 1, 2, and 3, except that an additional spring 70 has been placed in the cylinder 71, which otherwise corresponds to the cylinder 37, Figure 1. This spring is located in chamber 81 which corresponds to compression chamber 43', Figure 1. The spring 70 bears at one end against the piston 72, which is secured to the upper end of the neck or shank 73 of the ram 74 and has a sliding fit in the cylinder 71 serving the function of piston 40, Figure 1, and at its lower end it bears against the annular shoulder 75 surrounding the opening 76 at the lower end of the cylinder through which the shank 73 passes and in which it slides. The crosshead 77 differs from the crosshead 20, Figure 1, in that it is open at 79 around the wrist pin bearing 79' of the connecting rod 24 between the ears 78.

The constructions in Figures 4 and 6 are examples of the construction by which the advantages recited are best realized.

The construction, Figure 9, on the other hand, is similar in its operation to the construction, Figures 1 and 2, except that it lacks the cushioning effect and other effects of chamber 42 between the crosshead and the ram, which is present under certain conditions of operation in the construction of Figures 1 and 2 when the openings 43 are proportioned as shown. This assists the spring 46, Figures 1 and 2, in preventing impact of the piston 40 against the top of the cylinder 37 which in the construction shown is formed by the crosshead 20. This function is served entirely by the spring 82 in Figure 9.

I have thus described specifically and in detail a portable power hammer in several different forms embodying the features of my invention, the variation in form being intended to suggest certain variations in the manner of applying the invention and the description being specific and in detail in order that the manner of constructing, operating, and using the invention in the preferred form may be fully understood, however, the specific terms herein are used descriptively rather than in a limiting sense, the scope of the invention being defined in the claims.

What I claim as new and desire to secure by Letters Patent is:

1. The combination in a power hammer of a reciprocating slide, a guide therefor, a ram, a portion of said ram acting as a piston within said slide, a spring compressed between the slide and the ram, and means for supporting a bit in the path of the ram, a barrel enclosing the guide and spaced outwardly therefrom forming a circumferential jacket, means for introducing air into said jacket between the barrel and guide at one end of the barrel, the guide having ports near its respective ends and the slide and the ram operating as a piston in the guide to force air into the jacket at the upper end, the lower end of the guide cooperating with the ram after the manner of a pump cylinder for discharging the air from said jacket at the lower end of the guide.

2. The combination in a portable power hammer of a motor, a cross head operated thereby, a guide for said crosshead, a reciprocating member comprising a cylinder and a piston in the cylinder, a ram, one of said members being connected to the ram, the other said member being connected to the said cross head, a spring compressed between the ram and cross head, the cross head guide being in the form of a sleeve, a barrel enclosing the sleeve and spaced outwardly therefrom a bit in the path of the ram, a port for introducing air from the guide to the space between the barrel and sleeve, a port for discharging air from said space into the path of the ram, said cross head acting as a piston to force air from said guide into said space at the top, the ram serving as a piston to discharge the air from the lower end of the barrel in the vicinity of the bit, the lower end of the guide being in the form of a cylinder, the ram serving to compress the air in the guide end and discharge it in the direction of the work, the admission port being covered by the piston during the discharge.

3. The combination in a power hammer of reciprocating driving means, a guide therefor, two members comprising a cylinder and a piston supported therein by fluid pressure between the cylinder heads and piston, a ram, one said member being secured to the ram, the other said member being secured to the reciprocating driving means, a guide for the reciprocating driving means, a spring compressed between the said means and the ram and a spring in said cylinder opposed to the first mentioned spring and compressed between the piston and an opposite abutment in the cylinder.

4. The combination in a portable power hammer of a motor, a crosshead reciprocated thereby, a ram, a guide for the crosshead, a cylinder and a piston therein, one being carried by the crosshead and the other by the ram, a spring compressed between the ram and the crosshead, a restricted passage for venting the end of the cylinder beyond the piston, which said end forms a vacuum and pressure chamber to transmit the motion of the cross-head to the ram and to modify it, the cylinder also having a port which is covered by the piston in its normal working position but is uncovered when the ram moves beyond the end of its normal working stroke.

5. The combination in a portable power hammer of a motor, a cross head reciprocated thereby, a guide for the cross head, a ram, two members comprising a cylinder and a piston in the cylinder, one said member being connected to the ram and the other to the cross head, a resilient means compressed between the ram and the cross head, restricted passages for venting the upper end of the cylinder, the cylinder also having a port covered by the piston in the lower normal working position of the ram, and a bit in the path of the ram, the pressure and vacuum in the cylinder, together with the resilient means serving to transfer the motion of the cross head to the ram and to modify the same, said port being uncovered at the end of the forward stroke of the ram when the hammer is operated with the bit removed from the path of the ram, the ram being thus partially released to reduce vibration.

6. The combination in a portable power hammer of a rotary driving means, a cross head and a connecting rod, a guide for the crosshead, a barrel forming a jacket surrounding the guide, a ram within the barrel operated by the crosshead, and means for passing air through the jacket in the direction of the stroke of the ram to cool and ventilate the same, said means including a fan driven by the rotary driving means, delivering air to one end of the jacket, the ram operating as a piston to discharge the air from the end of the barrel or jacket in the vicinity of the bit.

7. The combination in a portable power hammer of a rotary driving means, a cross head and a connecting rod, a guide for the crosshead, a barrel forming a jacket surrounding the guide, a ram within the barrel operated by the cross head, and means for passing air through the jacket in the direction of the stroke of the ram to cool and ventilate the same, said means including a fan driven by the rotary driving means, delivering air to one end of the barrel, the ram operating as a piston to discharge the air from the end of the barrel in the vicinity of the bit, the air draft being mainly in contact with the outer wall of the barrel.

8. The combination in a power hammer of a reciprocating crosshead, a guide therefor, two members comprising a cylinder and piston cooperating to set up a fluid pressure on the piston, one said member being secured to the ram and the other said member to the crosshead, a spring compressed between the crosshead and the ram, the said spring and fluid pressure serving to vary and control the relation of the ram to the crosshead and means for supporting a tool shank in the path of the ram.

9. The combination in a power hammer of a reciprocating crosshead, a guide therefor, two members comprising a cylinder and piston cooperating to set up a fluid pressure on the piston, one said member being secured to the ram and the other said member to the crosshead, a spring compressed between the crosshead and the ram, the said spring and fluid pressure serving to vary and control the relation of the ram to the crosshead and means for supporting a tool shank in the path of the ram, the cylinder having at one end a port for the admission of the air which is covered by the piston at the end of the working stroke.

10. The combination in a power hammer of a reciprocating crosshead, a guide therefor, two members comprising a cylinder and piston cooperating to set up a fluid pressure on the piston, one said member being secured to the ram and the other said member to the crosshead, a spring acting on the ram to be compressed by the ram on the back stroke, the said spring and fluid pressure serving to vary and control the relation of the ram to the crosshead and means for supporting a tool shank in the path of the ram, the cylinder having at one end a port for the admission of the air which is covered by the piston at the end of the working stroke, and a vent for varying the pressure in said cylinder.

11. The combination in a portable power hammer of a motor, a guide, a follower reciprocated in the guide by the motor, a ram, means for retaining a bit in the path of the ram, two members comprising a cylinder and a piston in said cylinder, one said member being connected to the ram and the other to the follower, resilient means compressed between the ram and the follower, a restricted passage for venting the end of the cylinder beyond the piston, which cylinder end serves as a pressure chamber to transmit the motion of the follower to the ram, the cylinder also having a port which is covered by the piston in the normal working positions, but is uncovered when the bit is removed and the ram moves beyond its normal working position, the ram being thus partially released to prevent excessive vibration.

12. The combination in a portable power hammer of reciprocating driving means, a guide therefor, two members comprising a cylinder and a piston in the cylinder adapted to reciprocate in said cylinder, a ram, one said member being connected to the ram and the other to the reciprocating driving means, providing a vacuum and pressure connection between the ram and driving means and a spring compressed between the reciprocating member and the ram, the reciprocating driving means operating in said guide as a piston in its cylinder, said guide also acting as a guide for the ram, a barrel enclosing the guide, the guide being spaced inwardly from the barrel providing an air jacket for the guide, an air inlet passage leading to the jacket at the top and a transfer port connecting the jacket and guide at the bottom, the reciprocating driving means serving to introduce air at the top of said jacket and the ram serving to discharge it therefrom at the bottom.

13. The combination in a portable power hammer of reciprocating driving means, a guide therefor, two members comprising a cylinder, a piston in the cylinder adapted to reciprocate therein, a ram, one said member being connected to the ram and the other to the reciprocating driving means providing a connection between the driving means and the ram, said reciprocating driving means operating in said guide as a piston in its cylinder, said guide also acting as a guide for the ram, which also has a piston action, a barrel, the guide being spaced inwardly from the barrel providing an air jacket for the guide and means including the driving means operating as a piston for supplying air to the jacket at the top, the jacket having an opening through which air is discharged at the bottom in the path of the ram, a discharge passage leading outwardly from the guide, the ram serving as a piston to draw air from the jacket and discharge it through said latter passage.

14. The combination in a power hammer of a guide, a follower in said guide and power means for reciprocating the same, a ram in the guide connected to the follower to be reciprocated thereby, means for supporting a bit in the path of the ram, a barrel enclosing the guide and spaced outwardly therefrom forming a jacket, means for introducing air into said jacket at one end of the barrel, said means including the follower operating as a piston in the guide, the lower end of the guide providing a compression space below the ram for compressing air and discharging the air at the lower end of the barrel, the guide having openings for admitting air therein from said jacket beneath the ram and for the discharge of the air therefrom.

15. The combination in a power hammer of a reciprocating crosshead, a guide therefor, two members comprising a cylinder and piston cooperating to set up a fluid pressure on the piston, one said member being secured to the ram and the other said member to the cross head, a spring compressed between the crosshead and the ram, the said spring and fluid pressure serving to vary and control the relation of the ram to the crosshead and means for supporting a tool shank in the path of the ram, the cylinder having a vent in the vicinity of the head end to compensate for changes of recoil by varying the pressure and vacuum in the cylinder in response to such changes.

16. The combination in a power hammer of a reciprocating crosshead, a guide therefor, two members comprising a cylinder and piston cooperating to set up a fluid pressure on the piston, one said member being secured to the ram and the other said member to the crosshead, resilient means compressed between the crosshead and the ram, the said resilient means and fluid pressure serving to vary and control the relation of the ram to the crosshead and means for supporting a tool shank in the path of the ram, whereby the recoil of the ram from the tool serves to return the ram compressing the resilient means and compressing the air in the cylinder, the subsequent expansion of the resilient means and air increasing the speed of the ram toward the end of the down stroke.

17. The combination in a power hammer of a reciprocating crosshead, a guide therefor, two members comprising a cylinder and piston cooperating to set up a fluid pressure on the piston, one said member being secured to the ram and the other said member to the crosshead, resilient element compressed between the crosshead and the ram, the said element and fluid pressure serving to vary and control the relation of the ram to the crosshead and means for supporting a tool shank in the path of the ram, the cylinder having a vent near its head end, whereby the recoil of the ram from the tool serves to return the ram to a position to receive energy from the cross head, compressing the resilient element and storing energy to be applied to the ram after the cross head passes the center of the down stroke.

18. The combination in a power hammer of a reciprocating crosshead, a guide therefor, two members comprising a cylinder and piston cooperating to set up a fluid pressure on the piston, one said member being secured to the ram and the other said member to the cross head, resilient means compressed between the crosshead and the ram, the said resilient means and fluid pressure serving to vary and control the relation of the ram to the cross head and means for supporting a tool shank in the path of the ram, the cylinder having a restricted vent to compensate for changes of recoil by varying the pressure and vacuum in the cylinder in response to such changes.

JAMES N. BAKER.